A. D. JUDD.

Picture Nail.

No. 9,440. Reissued Nov. 2, 1880.

Witnesses:

Chas. H. Smith

Harold Serrell

Inventor:

Albert D. Judd.

per Lemuel W. Serrell,

Attj.

N. PETERS, PHOTO-LITHOGRAPHER, WASHINGTON, D. C.

UNITED STATES PATENT OFFICE.

ALBERT D. JUDD, OF NEW HAVEN, CONNECTICUT.

PICTURE-NAIL.

SPECIFICATION forming part of Reissued Letters Patent No. 9,440, dated November 2, 1880.

Original No. 47,023, dated March 28, 1865. Application for reissue filed March 10, 1880.

*To all whom it may concern:*

Be it known that I, ALBERT D. JUDD, of New Haven, in the county of New Haven and State of Connecticut, have invented an Improvement in Picture-Nails, of which the following is a specification.

Before my present invention picture-nails had been made with removable ornamental heads, the head being screwed upon the end of the nail. In other instances the ornamental head had been provided with a loop of metal connected to the back plate of the head, and into this loop the end of the L-shaped nail passed, this form being common in the nails and screws used for curtain ornaments.

In my present invention I make use of a metal back to the ornamental head, and in that metal back there is an opening, so that the portions of the nail that retain the ornamental head pass behind the metal of the back and between the same and the ornamental head to connect the parts. The head is disconnected from the nail by moving the same until the projecting portions of the nail are clear of the metal back of the ornamental head. By this construction the separate metal loop connected to the back of the head is dispensed with, and the nail itself has projections for connecting the ornamental head instead of the screw, as heretofore used.

By my improvement the ornamental head is rendered lighter and less expensive, because the metal does not require to be thick for receiving a screw-thread, as heretofore employed.

Figure 2:
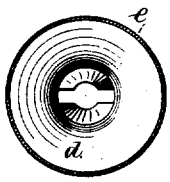
Figure 1:
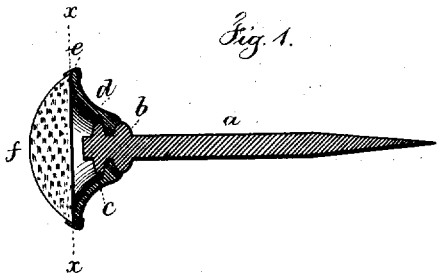
Figure 3:
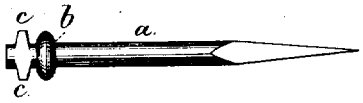

In the drawings, Figure 1 is a section longitudinally of the nail and head. Fig. 2 is a section at *x x*, showing the surface of the metal back that is next to the ornamental head, and Fig. 3 shows the nail itself.

The nail *a* is of suitable size, and there are projections *c c* thereon.

The ornamental portion *f* of the head is of porcelain or other suitable material, and *d* is the metal back for the same. These parts are shown as connected by the band *e* at their edges, or other device adapted to the character of the ornamental head may be used.

The projections *c* of the nail *a* catch upon the surface of the back *d* which is next the ornamental head *f*, and said back *d* has an opening, into which said projections *c c* pass, and the collar *b* on the nail *a* is represented as a means for preventing the head slipping too far upon the nail, and the surfaces of *d*, into which the projections *c* come into contact, being inclined, cause the parts *c c* to wedge or clamp, and thereby firmly hold the head upon the nail.

The collar *b* allows a claw-hammer to be used in withdrawing the nail.

It is to be understood that the nail is driven when the ornamental head is not upon the same, and that said head is afterward placed upon the nail and turned or brought into contact with the inclined surfaces, so as to connect the head quickly and securely.

I claim as my invention—

1. In a picture-nail having an ornamental removable head, an opening in the head and projecting portions on the nail, substantially as set forth, whereby the projecting portions of the nail pass in between the metal back and the ornamental portion of the head, substantially as set forth.

2. The combination, with a nail having projections at the head, of a removable ornamental head having an opening in the metallic back for the reception of the projections upon the nail, substantially as set forth.

Signed by me this 8th day of March, A. D. 1880.

ALBERT D. JUDD.

Witnesses:

O. J. MARTIN,

LEWIS A. NORTHROP.